T. PIECHOWICZ.
CLAMPING OR HOLDING TONGS FOR MEAT BLOCKS.
APPLICATION FILED MAR. 14, 1917.
1,295,790.
Patented Feb. 25, 1919.
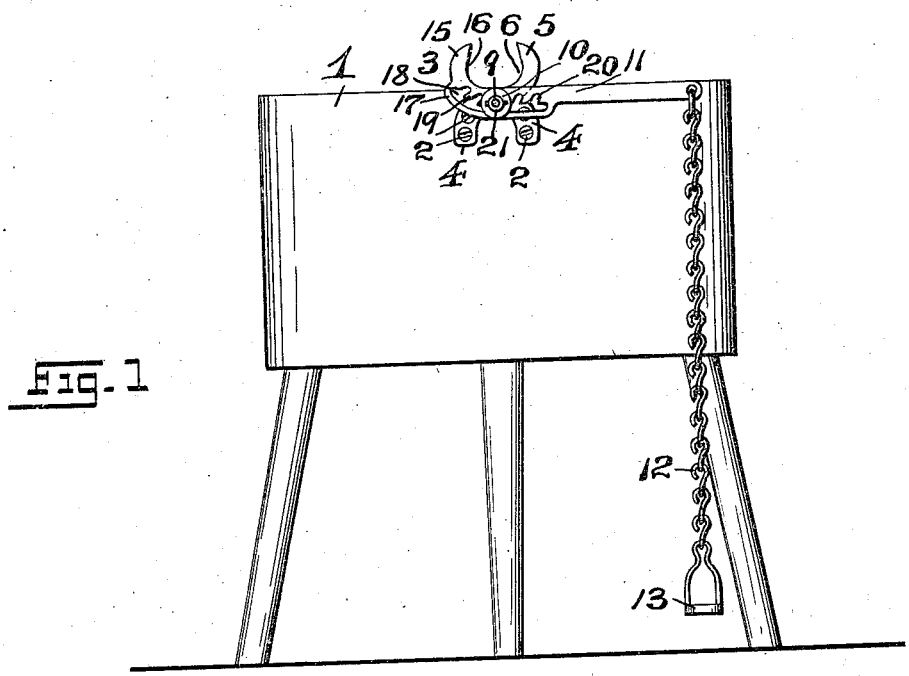
Fig. 1
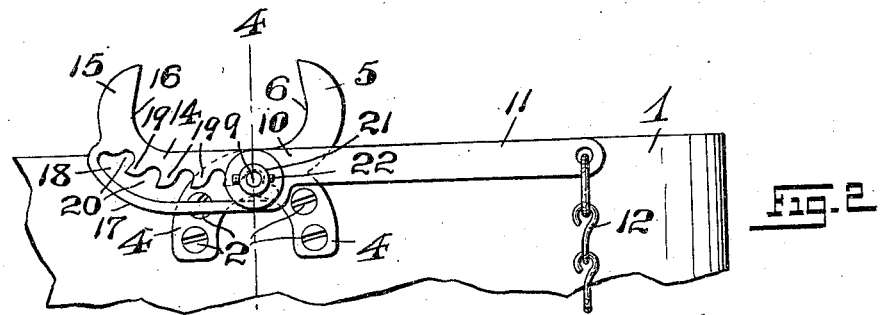
Fig. 2
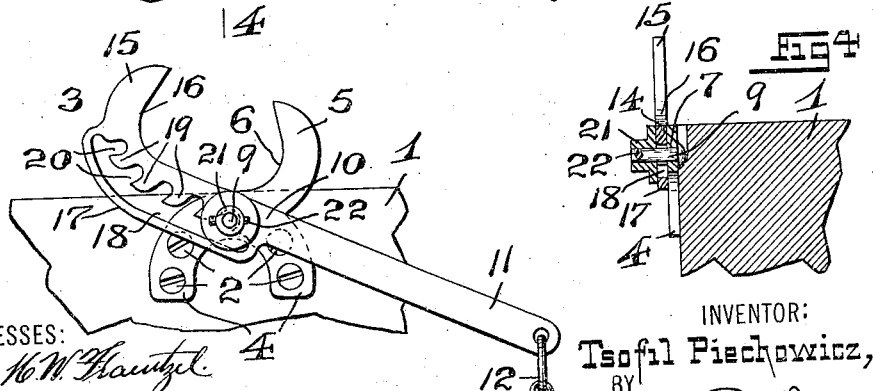
Fig. 3
Fig. 4
WITNESSES:
INVENTOR:
Tsofil Piechowicz,
BY
Fraenzel and Richards,
ATTORNEYS.

UNITED STATES PATENT OFFICE.

TSOFIL PIECHOWICZ, OF UNION TOWNSHIP, UNION COUNTY, NEW JERSEY.

CLAMPING OR HOLDING TONGS FOR MEAT-BLOCKS.

1,295,790.　　　　　Specification of Letters Patent.　　Patented Feb. 25, 1919.

Application filed March 14, 1917. Serial No. 154,673.

*To all whom it may concern:*

Be it known that I, TSOFIL PIECHOWICZ, a citizen of the United States, residing at Union township, in the county of Union and State of New Jersey, have invented certain new and useful Improvements in Clamping or Holding Tongs for Meat-Blocks; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in clamping or holding devices; and, the present invention relates, more particularly, to a novel clamping device, in the form of holding tongs attachable to and for use with the meat blocks, such as are used by butchers.

The present invention has for its principal object the production of a novel and simply constructed, as well as efficiently operating clamping device or holding tongs, adapted to be attached to a meat-block, the holding jaws of which are preferably and easily adjustable, so as to hold in position upon the block meat and bones of different sizes, thereby avoiding the necessity of holding the meat or bone, by hand, during the operation of cutting, chopping, or sawing the same, upon the block.

The invention has for its further object to provide a means for more positively holding meat or bones upon the meat-block than can ordinarily be done by hand, and also to avoid possible injury to the operator.

Other objects of the invention not at this time more particularly enumerated will be clearly understood from the following detailed description of the present invention.

With the various objects of the present invention in view, the said invention consists, primarily, in the novel meat and bone-holding tongs for the use of butchers hereinafter more fully set forth; and, the invention consists, furthermore, in the novel arrangements and combinations of the various devices and parts, as well as in the details of the construction of the said parts, all of which will be more fully described in the following specification, and then finally embodied in the clause of the claim which are appended to and which form an essential part of the said specification.

The invention is illustrated in the accompanying drawings, in which:—

Figure 1 is a view of a butcher's meat-block, having attached thereto a meat and bone-holding or clamping means made according to and embodying the principles of the present invention.

Figs. 2 and 3 are views, on an enlarged scale, of fragmentary portions of the meat-block, showing in elevation and attached to the meat-block, the meat and bone-holding or clamping tongs in their variously adjusted relations; and Fig. 4 is a transverse vertical section of the same, said section being taken on line 4—4 in said Fig. 2.

Similar characters of reference are employed in all of the said above described views, to indicate corresponding parts.

Referring now to the said drawings, the reference-character 1 indicates the usual form of butcher's meat-block to which is secured by means of screws 2, or in any other suitable manner, the meat and bone-holding or clamping device or tongs, indicated by the reference-character 3, and made according to and embodying the principles of the present invention.

The said holding or clamping device or tongs consists essentially, of an element or member, as 4, suitably perforated for the reception of the above-mentioned screws 2, by means of which the said member 4 is secured upon the side of the meat-block at a point near the upper or chopping surface of the said block. The said element or member 4 is also provided with an upwardly projecting horn 5 which is suitably curved, as at 6, and provides a clamping or holding jaw, as will be understood. In its main-portion, the said element or member 4 is provided with a pin-receiving hole or perforation 7 for the reception of a pin 9. Pivotally mounted upon said pin, so as to be also movable and adjustably disposed with relation to the said clamping or holding jaw 5, is a tong-member or element 10 comprising a lever or arm-portion 11 to the free end-portion of which is attached a chain 12 or other suitable operating means which is provided with a foot-piece or stirrup 13 for the proper operation of the said lever or arm 12. The said tong-member or element 10 is also provided with another arm-like member or portion, as 14, which is provided upon its free end-portion with an upwardly projecting horn 15, suitably curved, as at 16, to provide a second holding or clamping jaw. Extending from the lower edge-portion of said arm-like member 14 and connected with the lower edge-portion of the lever or arm-portion 11 is a segment-like member 17 which provides a correspondingly shaped opening, as 18, and into which extend from the said arm-like portion or member 14, as shown in the several figures of the drawings, suitably shaped retaining teeth or projections 19, having intervening spaces 20 between them, for the proper pivotal arrangement of the tong-member or element 10 upon said pin 9, and for its proper adjustment with relation to said pin, so as that a limited or an extended range of the holding or clamping jaws 5 and 16 may be readily and quickly obtained. The previously-mentioned pin 9 is of such length that its shank extends sufficiently beyond the outer face of the said tong-member or element 10, for the reception thereon of a retaining nut, as 21, which may be pinned upon said shank-portion by means of a pin, as 22, and whereby the two tong-members or elements are operatively connected, as will be clearly evident.

The operation of the device for the holding or retaining in proper position upon the meat-block of pieces of meat and bones varying in size will be fully understood from an inspection of the several figures of the drawings, and any further description of the operation and adjustments of the connected tong-members or elements is therefore deemed unnecessary.

Of course I am aware that some changes may be made in the general arrangements and combinations of the various devices and parts, as well as in the details of the construction of the said parts, without departing from the scope of the present invention as set forth in the foregoing specification, and as defined in the clauses of the claims which are appended thereto. Hence, I do not limit my present invention to the exact arrangements and combinations of the said devices and parts as described in the said specification, nor do I confine myself to the exact details of the construction of the said parts as illustrated in the accompanying drawings.

I claim:—

In combination with a supporting block having a recess in one of its sides, of a member having a semicircular base and a curved horn extending from said base, said base being secured to the block over the recess, a second member, a pin pivoting the second member to the base and having its head engaging the recess, said second member having an extended part having a slot therein and a curved horn at its end, one of the walls of the slot having recesses therein adapted to be engaged by the pivot pin for adjusting the second member relative to the first member and a handle connected with the second member.

In testimony that I claim the invention set forth above, I have hereunto set my hand this 12th day of March, 1917.

TSOFIL PIECHOWICZ.

Witnesses:
 FREDK. C. FRAENTZEL,
 FREDK. H. W. FRAENTZEL.

Copies of this patent may be obtained for five cents each, by addressing the "Commissioner of Patents, Washington, D. C."